United States Patent [19]

Hareng et al.

[11] 4,099,857
[45] Jul. 11, 1978

[54] THERMO-OPTIC LIQUID-CRYSTAL DEVICE FOR REAL-TIME DISPLAY OF ANIMATED IMAGES

[75] Inventors: Michel Hareng; Serge Le Berre, both of Paris, France

[73] Assignee: Thomson-CSF, Paris, France

[21] Appl. No.: 632,955

[22] Filed: Nov. 18, 1975

[30] Foreign Application Priority Data

Nov. 21, 1974 [FR] France .............................. 74 38281

[51] Int. Cl.² .............................................. G02F 1/13
[52] U.S. Cl. .................................... 350/351; 250/331
[58] Field of Search ................. 350/160 LC; 250/331

[56] References Cited

U.S. PATENT DOCUMENTS

| | | | |
|---|---|---|---|
| 3,410,999 | 11/1968 | Fergason et al. | 350/160 LC X |
| 3,637,291 | 1/1972 | Kessler et al. | 350/160 LC |
| 3,836,243 | 9/1974 | Melchior | 350/160 LC X |
| 3,854,793 | 12/1974 | Kahn | 350/160 LC |

*Primary Examiner*—Edward S. Bauer
*Attorney, Agent, or Firm*—Cushman, Darby & Cushman

[57] ABSTRACT

The invention provides a liquid crystal imaging system which employs a transitory thermo-optic effect to permit notably the reproduction of T.V. images. This transitory effect is characterized by the fleeting appearance of scattering cybotactic zones in the transparent liquid phase of a mesomorphic material, at the very beginning of the transition to a nematic transparent ordered phase. The duration of the scattering period can be considerably shortened by subjecting the mesomorphic material layer to the action of an alternating electrical field.

2 Claims, 4 Drawing Figures

THERMO-OPTIC LIQUID-CRYSTAL DEVICE FOR REAL-TIME DISPLAY OF ANIMATED IMAGES

FIELD OF THE INVENTION

The invention relates to a liquid crystal imaging system, and more specifically, to an imaging system which employs a transitory thermo-optic effect to permit notably the reproduction of animated images transmitted at a distance, such as for example televised images.

BACKGROUND OF THE INVENTION

In the prior art, devices are known which employ thin layers of mesomorphic materials subjected to a thermo-optical effect to reproduce images transmitted at a distance. In a general manner, these devices comprise a cell in which the material, interposed between two transparent sheets, is preheated to a temperature which is lower by several degrees Centigrade than the transition temperature from the mesomorphic phase utilised (the smectic or cholesteric phase) either to a further mesomorphic phase or to an isotropic liquid phase. The mode of procedure is such that the layer is uniformly oriented, either due to previous processing of the face of the support sheets contacting the layer, or due to application of an alternating field; thus, the layer is perfectly and uniformly transparent.

A beam of light, generally selected within the near-infrared zone and intensity modulated by a signal transmitting the image to be recorded, sweeps the cell. When the energy supplied at one point of the cell by the beam has been adequate to locally heat the liquid crystal to beyond the transition point at which the latter is converted to an isotropic liquid, there is locally formed, during the rapid return to the initial mesomorphic phase, a disordered texture (known as a focal-conic structure) which is optically scattering; on the contrary, when the luminous energy supplied by the modulated beam has been inadequate, the corresponding point retains the initial, uniform orientation and remains transparent. On projecting the image of the cell on to a screen by an appropriate optical device, the non-scattering spots of the cell appear as brilliant spots and the diffusing spots as dark spots.

The focal-conic structure thus set up within the material in the mesomorphic phase is stable. The devices constituted in this manner are storage devices able to preserve the recorded image for a duration varying between several hours and several days. In order to erase the recorded image, it is possible either to scan the cell with the luminous beam at full intensity and to then slowly recool the layer, or to submit the layer to the action of an alternating field, with or without sweeping by the beam.

The erasive time is always relatively slow (0.1 s for the fastest device). Consequently, it is impossible to employ such systems to reproduce animated images, for example televised images, since it is known that, in order to avoid scintillation, the projection rate must be at least equal to some 20 images per second.

SUMMARY OF THE INVENTION

In order to palliate this drawback of the prior art, the invention proposes to utilise a new thermo-optic effect, observed in materials exhibiting a nematic state isotropic phase transition. This effect is characterised by the fleeting appearance of scattering cybotactic zones in the body of the transparent liquid phase, at the very beginning of the transition to the transparent nematic phase. Since this effect is essentially transitory, the recorded image spontaneously vanishes, and this takes place in a time sufficiently short to permit the achievement of a recording rate of 25 images per second.

BRIEF DESCRIPTION OF THE DRAWING

This invention, together with is features, advantages and objects will be better understood from the following detailed description when read in conjunction with the attached drawing, in which.

DETAILED DESCRIPTION

Figure 1:
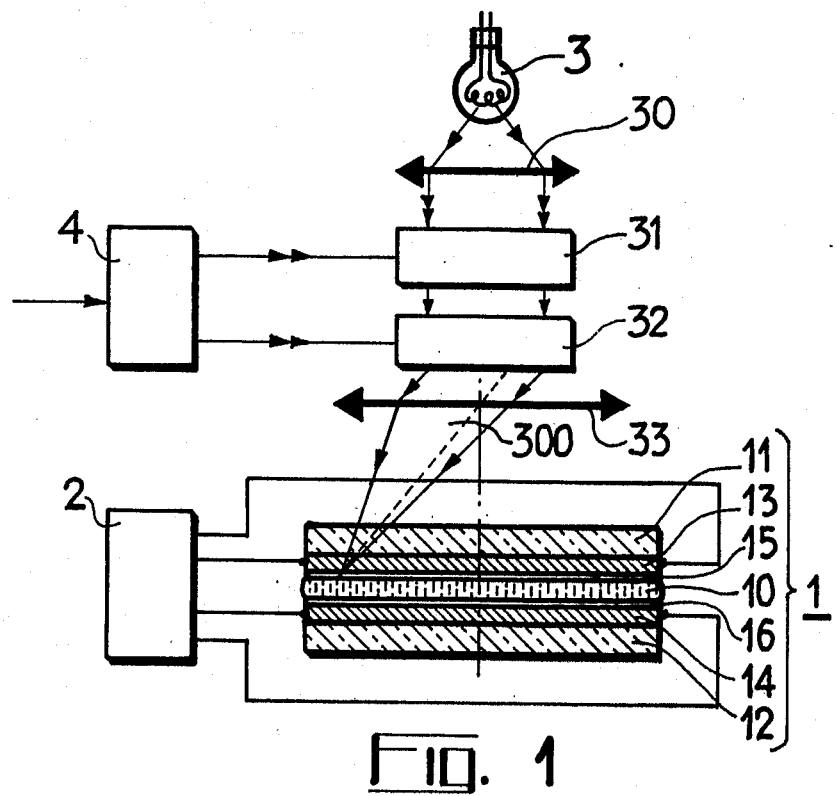
FIG. 1 shows a first embodiment of the device for the reproduction of images according to the invention, wherein the thin layer is locally heated by a moving beam of light.

Research work effected in the laboratory of the Applicants and relating to the isotropic liquid mesomorphic phase transition have shown that, notably in those materials wherein thus mesomorphic phase is a nematic phase, there is observed an extremely fleeting pre-transitional effect characterised by the appearance of cybotactic zones within the isotrope liquid phase. These zones are constituted of ordered, birefringent microdomains, without an orientation relationship between each other and constituting the germs of the mesomorphic phase which will be progressively established within the liquid. If the walls contacting the material have been subjected to surface treatment promoting uniform orientation of the mesomorphic phase, the germs are spontaneously reoriented relative to each other and afford a mesomorphic layer the orientation of which is uniform and which is thus as perfectly transparent as is the original isotropic liquid phase. Consequently, if a layer of a material exhibiting for example an isotropic liquid-nematic transition is arranged between two sheets of glass which have been subjected to an appropriate surface treatment (coating with silica in the case of a material having positive dielectrical anisotropy, and with silane in the contrary case for instance), and cooled from isotropic liquid state to the nematic state, the crystallographic evolution previously described will be accompanied by the following evolution of the optical properties: the layer remains transparent until the transition temperature is reached, and then becomes temporarily strongly diffusing when the cybotactic appear, becoming once again perfectly transparent when the mesomorphic phase is established. The measurements effected have shown that the lapse of time during which the layer becomes scattering is extremely short and can not exceed 0.05 s in the case of a nematic material with negative dielectric anisotropy. They have also shown that the duration of the scattering period could be still further considerably shortened by subjecting the layer to the action of an alternating electrical field of some kilocycles per second frequency, thereby accelerating the realignment of the molecules in the nematic phase.

The present invention proposes to profit from the observations described hereinabove to effect image reproduction without memory effect, and notably to reproduce animated scenes in "real time". For this purpose, a liquid crystal cell is prepared with a material exhibiting the pre-transitional effect previously described and disposed in a thin, uniformly oriented layer. The layer is maintained at a temperature such that the material is in the mesomorphic phase. Selective heating means, triggered by the video signal transmitting the image to be recorded, make it possible to increase up to that temperature at which the material is in an isotropic liquid phase those of the points of the layer which it is desired to render diffusing; these points will correspond, depending on the modes of lighting and observation of the cell, either to dark or luminous points of the image to be recorded; on returning from the isotropic liquid state to the oriented mesomorphic state, they diffuse the light during the short period of time in which the cybotactic zones are formed; the non-heated spots remain transparent. Thus, with such a cell it becomes possible to reproduce animated images by a process highly comparable to that of the fluorescent screen of a television cathode tube, wherein the spots excited by the beam of electrons emit a remanent light during approximately the duration of an image. The essential difference is that, in the present invention, the "excited" spots emit no light but permit modulation of the light derived from an external source, which may thus be selected to be extremely intense, in such manner for example as to project the images recorded on the cell on to a large-dimension screen.

FIG. 1 shows a first embodiment of the device for the reproduction of images according to the present invention, in which embodiment the means for selective heating of the cell are constituted by a luminous beam.

A liquid crystal cell 1 is constituted by a thin layer 10, approximately 10 to 20 μm thick, of a material exhibiting an isotropic liquid/nematic phase transition; the said material may for example be M.B.B.A. (paramethoxybenzylidene-butyl aniline) or E.B.B.A (paraethoxybenzylidene-butyl aniline) or a mixture of these two substances. The thin layer 10 is disposed between two parallel glass sheets 11 and 12, both coated on their inner face with transparent electrodes 13 and 14 constituted by a deposit of tin oxide or indium, or a mixture of these two oxides. Silane coatings 15 and 16 disposed at the interface of the thin layer 10 and of the electrodes 13 and 14 promote uniform orientation of the material in the nematic phase. A voltage generator 2 permits application between the two elecrodes 13 and 14 of an alternating voltage of approximately 30 volts and several frequency kilocycles. This generator also permits the application of a unidirectional voltage between two ends of the electrode 14; thus, the two electrodes act as heating resistors and permit maintaining the thin layer 10 at a temperature very close to the nematic phase/isotropic liquid transition temperature, such that the material is in the nematic phase.

The luminous ray emitted by a source 3 is collected by the condenser 30, modulated by the modulator 31, deflected by the deflector 32, and focused by the objective 33 which thus supplies a moving beam 300 converging in the plane of the layer 10. The source 3 must possess sufficient intensity, taking into account the sweep velocity, to carry the volume of the layer 10 surrounding the point of convergence of the beam 300 from the mesomorphous phase to the isotropic liquid phase; it may advantageously be constituted by a YAG laser continuously emitting a beam of 1.06 μm wavelength. The modulator 30 may be an electro-optical modulator; it permits interruption of the luminous beam intensity when the swept point is required to remain in the mesomorphous phase. The deflector 32 permits the beam 300 to sweep the entire surface of the cell 1; it may be a mechanical deflector or, if the sweeping frequencies are high, as in the case of sweeping at television cadence, an assembly of two electro-optical or acousto-optical deflectors. The modulator 31 and the deflector 32 are triggered by a control generator 4 receiving the video signal characteristic of the images to be reproduced on the cell.

The energy carried by the luminous beam 300 is absorbed by the thin layer 10, if the material constituting the latter is sufficiently absorbent, either on itself or by means of impurities incorporated for this purpose, relative to the radiation emitted by the source 3. In the precise case of the device shown in FIG. 1, wherein the material utilised absorbs radiation emitted by the YAG source, within near-infrared range, only to very slight degree, the conducting layers 13 and 14 fulfill a triple role; on the one hand, they absorb nearly all the energy of the beam 300 and communicate the heat given off to the part of the layer 10 which they enclose; on the other hand, they make it possible to subject this same layer to an alternating electrical field which, as already previously explained, reduces the time of appearance of scattering phenomena; finally, as stated hereinabove, they function as a heating resistance to maintain the thin layer at adequate temperature. These points swept by the beam 300 which have been brought to the isotropic liquid state, appear transitorially as scattering on subsequent cooling.

Figure 3:
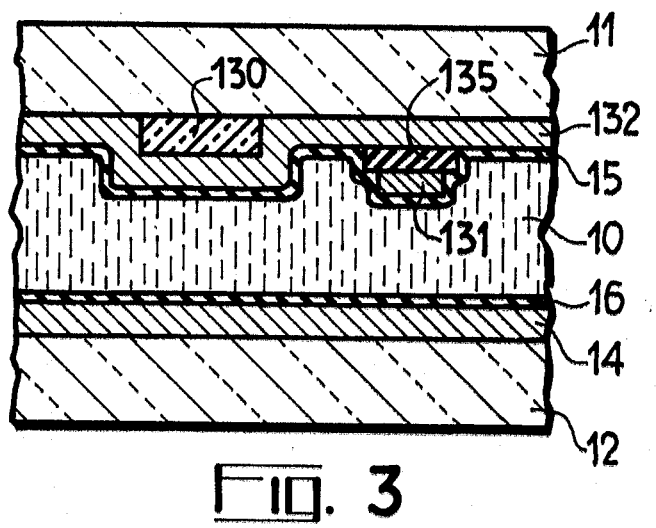
FIG. 3 shows a sectional view of the cell of which the element of FIG. 2 forms a part.
Figure 2:
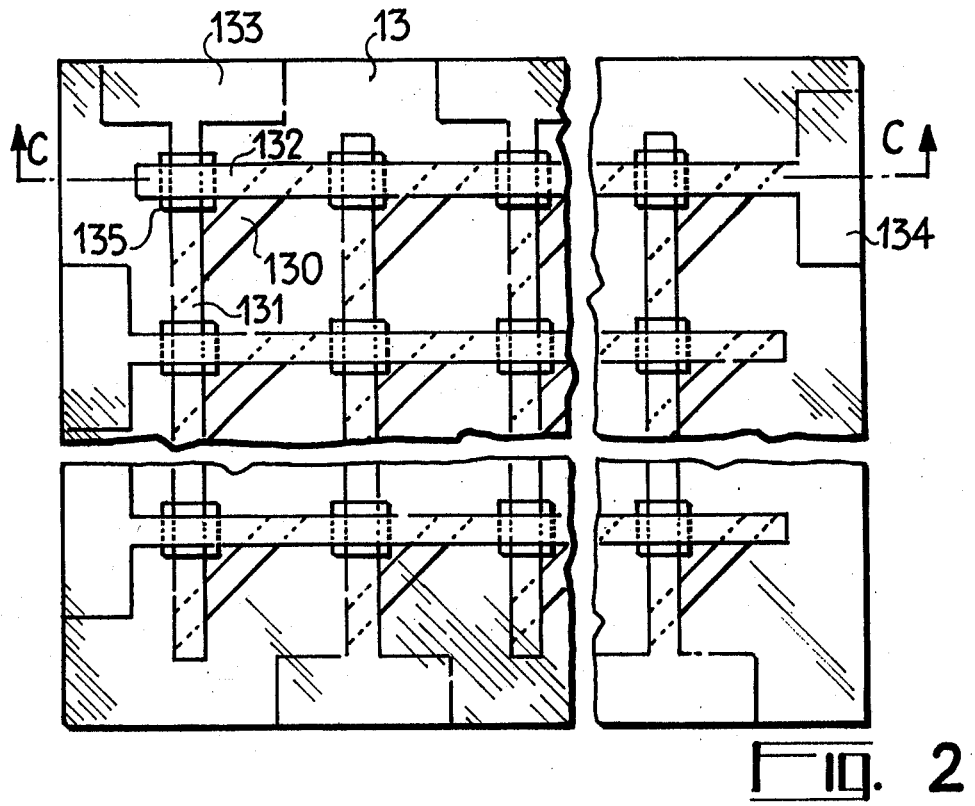
FIG. 2, which relates to a second embodiment of the invention, shows the arrangement on one of the support sheets of the cell of a conductor network feeding a matrix of resistive elements permitting the local heating of the thin layer.

FIGS. 2 and 3 relate to a second embodiment of the device for the reproduction of images according to the invention, wherein the means for selectively heating the cell are constituted by a matrix of resistive elements incorporated in the cell itself and fed by a mutiplexing device.

In this embodiment, as in the preceding one, a liquid crystal cell is constituted by interposing between two glass support sheets a thin layer of a material exhibiting a mesomorphic phase (for example a nematic phase), one of the sheets comprising the same coatings as in the preceding case and the other supporting the matrix of resistant elements. FIG. 2 shows a plan view of the latter support sheet, and FIG. 3 shows a section through the cell containing the support sheet of FIG. 2, section being effected along the straight line marked CC in FIG. 2.

Referring to both these figures, it will be appreciated that there are deposited on the support sheet 11, in the form of a regular matrix, resistive elements in the form of bars, such as the element 130; these elements are transparent and are constituted by a deposit of indium or tin oxide, or a mixture of these two oxides. The current inputs and outputs of these resistive elements are constituted by linear conductor elements, comprising a thin metal film for example of gold, covering the ends of the resistive elements; an analogous column of resistive elements is connected in parallel to a single input conductor element, such as the linear conductor element 131; similarly, all the resistive elements of one and the same line are connected in parallel to the same output conductor element, such as the element 132. The column conductor elements, such as the line conductor elements, are thus connected in parallel with each other and are uniformly spaced, the first and the second assembly being orthogonal. Terminals such as 133 and 134, uniformly distributed over the periphery of the support plate, permit ready connection between these elements and a device for feeding by multiplexing. Insulating deposits, such as 135, are interposed between the linear conductor elements at the point of intersection thereof; they are constituted for example by a thin layer of SiO or of a photoresist.

Referring to FIG. 3, this figure also shows that the assembly of the elements 130, 131, 132 and 135, to the exclusion of the terminals 133 and 134, are coated with a thin layer of silane 15 promoting uniform orientation of the mesomorphic phase. This same FIG. 3 also shows the thin layer 10 of mesomorphic material and also the second support sheet 12, successively coated with a transparent or reflecting electrode 14 and a thin deposit of silane 16.

The various elements coating the inner face of the support sheet 11 are deposited by successive vaporisation in vacuo, through appropriate masks.

Feeding of the resistive elements of the matrix is effected in accordance with the known multiplexing process, which may be summed-up in the following manner:

A triggering generator operating by multiplexing receives the video signal containing the information relating to the images to be recorded. The signals corresponding to the successive points of one and the same line are stored; when all the information concerning a line has been received, the device connects, via the channel of the adequate line terminal, the linear conductor of the same rank or order as the line received with all the terminals corresponding to those points of the line which require to be excited, in accordance with the stored signals. The voltage is thus applied between the terminals of only those resistive elements of one and the same line which have been selected by the channel of the column terminals. Whilst the resistive elements of the line of rank or order N are put under voltage, the generator stores the information concerning the line of order N + 1; as soon as this information is totally received, the line of order N is disconnected and replaced by the line of order N + 1, and the same process recommences once again. Those of the resistive elements which are thus put under voltage communicate the heat received to the subjacent element of the layer 10, which then passes from the mesomorphic phase to the isotropic liquid phase, and becomes temporarily scattering on subsequent cooling.

In addition to the multiplexing pulses, the control or triggering generator applies a constant peak value alternating voltage between on the one hand the assembly of line terminals and columns disposed on the support sheet 11 and on the other hand the electrode 14 disposed on the support sheet 12. As previously states, this voltage diminishes the duration during which the points excited in the layer 10 remain diffusing.

Depending on the transparent or reflecting nature of the electrode 14, the cell described hereinabove may be utilised by transmission or by reflection.

Figure 4:
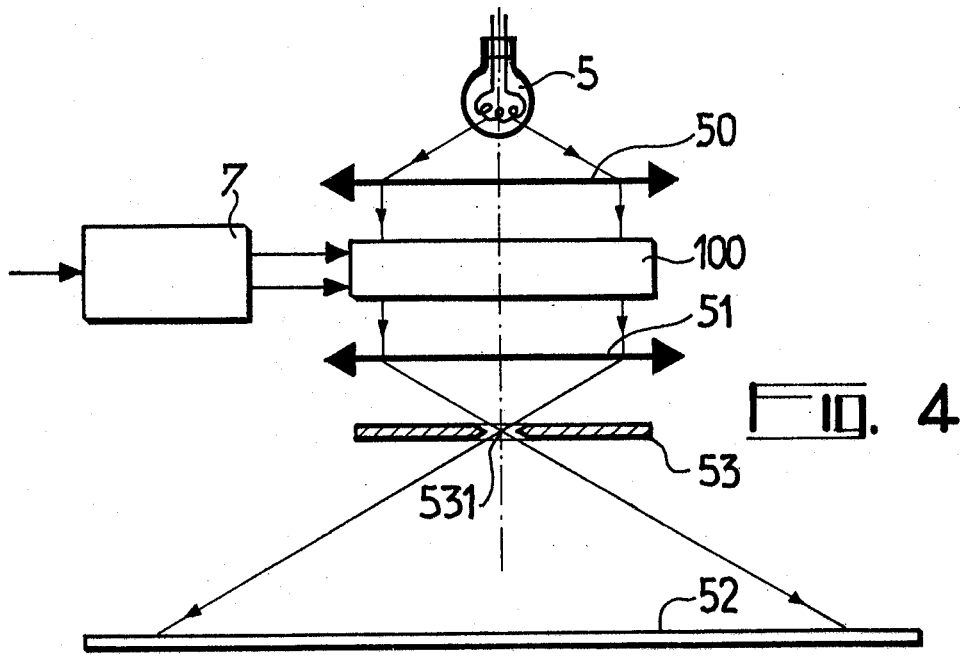
FIG. 4 shows, in accordance with the invention, a device for projection on a screen utilising the said device for the reproduction of images.

FIG. 4 shows an example of utilisation of the device for the reproduction of images according to the invention, for the projection on a screen of images reproduced by the liquid crystal cell. It concerns, more specially, the case of the cell described by FIGS. 2 and 3, but it may readily be applied to the case illustrated by FIG. 1.

FIG. 4 shows the liquid crystal cell 100, fed by the triggering generator 7 operating by multiplexing, which receives the video signal and distributes the feed voltages to the matrix of resistive elements. A source of light 5 illuminates the entire surface of the cell with parallel light by means of the condenser 50. The light transmitted by the cell is collected by the objective 51 which conjugates the plane of the thin layer 10 of mesomorphic material with the plane of a screen 52. A diaphragm 53, pierced with a circular orifice 530, arranged at the focus of the objective 51, permits passage to the screen 52 of only those beams which emerge from the cell 100 under quasi-normal emergence. Under these conditions, the points diffusing in the layer 10 are projected as dark points on the screen 52.

To adapt this projection device to the device shown in FIG. 1, it suffices to interpose on the path of the beam 300 in FIG. 1, a semi-transparent or dichroic mirror arranged at 45° relative to the optical axis of the system and reflecting onto the cell 10 the beam of parallel light emanating from the objective 50 of FIG. 4; the optical axis of the latter is then arranged parallel to the plane of the liquid crystal cell and at 45° relative to the semi-transparent or dichroic mirror.

What we claim is:

1. A method of utilizing a thermo-optical effect for real-time display of successive images in the form of scattering points in a thin transparent layer of a material exhibiting a mesomorphic state with direct transition to an isotropic liquid state comprising the steps of:
    maintaining said layer in uniform orientation at a first temperature in said mesomorphic state;
    temporarily heating said points to a second temperature in said isotropic liquid state;
    subsequently cooling from said isotropic liquid state to said mesomorphic state in uniform orientation so that light scattering cybotactic zones are transitorily formed in said points; and
    applying an AC voltage during the transition from said isotropic liquid state to said mesomorphic state to reduce the duration of the cybotactic zones and to maintain said layer transparent in said mesomorphic state.

2. A method according to claim 1, in which said mesomorphic state is a nematic state.

* * * * *